US009895787B2

(12) United States Patent
Rizzo et al.

(10) Patent No.: US 9,895,787 B2
(45) Date of Patent: Feb. 20, 2018

(54) METHODS FOR MODIFYING AND ADDING FEATURES ON GRINDING WHEEL SURFACES

(71) Applicant: United Technologies Corporation, Hartford, CT (US)

(72) Inventors: John P. Rizzo, Vernon, CT (US); Gordon M. Reed, Plantsville, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 58 days.

(21) Appl. No.: 14/563,313

(22) Filed: Dec. 8, 2014

(65) Prior Publication Data

US 2015/0174729 A1 Jun. 25, 2015

Related U.S. Application Data

(60) Provisional application No. 61/919,581, filed on Dec. 20, 2013.

(51) Int. Cl.
| | |
|---|---|
| *B24B 53/075* | (2006.01) |
| *B24B 53/00* | (2006.01) |
| *B24B 53/04* | (2012.01) |
| *B24B 53/12* | (2006.01) |
| *B23K 26/364* | (2014.01) |
| *B24B 53/06* | (2006.01) |

(52) U.S. Cl.
CPC .......... *B24B 53/001* (2013.01); *B23K 26/364* (2015.10); *B24B 53/005* (2013.01); *B24B 53/04* (2013.01); *B24B 53/06* (2013.01); *B24B 53/075* (2013.01); *B24B 53/12* (2013.01)

(58) Field of Classification Search
CPC ... B23K 26/364; B24B 53/001; B24B 53/005; B24B 53/04; B24B 53/075; B24B 53/12
See application file for complete search history.

(56) References Cited

U.S. PATENT DOCUMENTS

| | | | | | |
|---|---|---|---|---|---|
| 4,533,812 | A | * | 8/1985 | Lorenz | B23F 21/02 |
| | | | | | 219/121.19 |
| 6,217,422 | B1 | * | 4/2001 | Franca | B24B 37/04 |
| | | | | | 451/444 |
| 6,312,324 | B1 | * | 11/2001 | Mitsui | B24B 3/06 |
| | | | | | 125/39 |
| 6,478,661 | B2 | * | 11/2002 | Ohmori | B24B 13/015 |
| | | | | | 451/21 |
| 6,899,592 | B1 | * | 5/2005 | Kojima | B24B 37/245 |
| | | | | | 451/286 |
| 7,175,509 | B2 | * | 2/2007 | Gunjima | B23K 26/0078 |
| | | | | | 451/177 |
| 2015/0028007 | A1 | * | 1/2015 | Pluss | B24B 53/00 |
| | | | | | 219/121.69 |

* cited by examiner

*Primary Examiner* — Timothy V Eley (74) *Attorney, Agent, or Firm* — Snell & Wilmer, L.L.P.

(57) ABSTRACT

Systems and methods are disclosed herein for adding surface features to grinding wheels. A laser may be directed substantially perpendicular to a grinding surface of a grinding wheel. The laser may be pulsed and may ablate material from the grinding surface. The laser may move relative to the grinding wheel in order to ablate shaped surface features into the grinding surface.

11 Claims, 7 Drawing Sheets

FIG. 5

METHODS FOR MODIFYING AND ADDING FEATURES ON GRINDING WHEEL SURFACES

CROSS-REFERENCE TO RELATED APPLICATIONS

This application is a nonprovisional of, and claims priority to, and the benefit of U.S. Provisional Application No. 61/919,581, entitled "SYSTEMS AND METHODS FOR MODIFYING AND ADDING FEATURES ON GRINDING WHEEL SURFACES," filed on Dec. 20, 2013, which is hereby incorporated by reference in its entirety.

FIELD

The present disclosure relates generally to grinding wheels. More particularly, the present disclosure relates to modifying and adding features on grinding wheel surfaces.

BACKGROUND

Grinding wheels generally comprise an abrasive compound in a circular component. Grinding wheels may be rotated at high speeds to remove material from a workpiece. During grinding, a coolant may be applied to the grinding wheel in order to minimize overheating of the grinding wheel or the workpiece. Dressing the grinding wheel may expose abrasive grains by removing the grinding wheel bond or workpiece material embedded in the grinding surface of the grinding wheel. Dressing may improve grinding efficiency of the grinding wheel. Conventional dressing techniques involve a dressing tool, such as a diamond wheel grinding the grinding surface of the grinding wheel in order to achieve a desired shape and surface finish of the grinding surface. Adding surface features to the grinding wheel may help decrease radial contact, spindle power consumption, and heat input, while increasing coolant delivery and chip evacuation.

SUMMARY

A method of dressing a grinding wheel may comprise directing a laser substantially perpendicular to a grinding surface of a grinding wheel. The method may comprise pulsing the laser. The method may also comprise forming a surface feature in the grinding surface using the laser.

A grinding method may comprise laser ablating a first surface feature in a grinding wheel. The method may comprise grinding a first workpiece with the grinding wheel. The method may further comprise laser ablating a second surface feature in the grinding wheel. The method may further comprise grinding a second workpiece with the grinding wheel A dressing system may comprise a laser and a steering mechanism. The laser may be configured to be directed substantially perpendicular to a grinding surface of a grinding wheel. The steering mechanism may be configured to steer the laser.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Systems and methods are disclosed herein for adding surface features to grinding wheels. A laser may be directed substantially perpendicular to a grinding surface of a grinding wheel. The laser may be pulsed and may ablate material from the grinding surface. The laser may move relative to the grinding wheel in order to ablate shaped surface features into the grinding surface. The surface features may enhance the effect of a coolant being applied to the grinding surface during grinding of a workpiece, as well as diminish the horsepower necessary to drive the grinding wheel.

Figure 1:
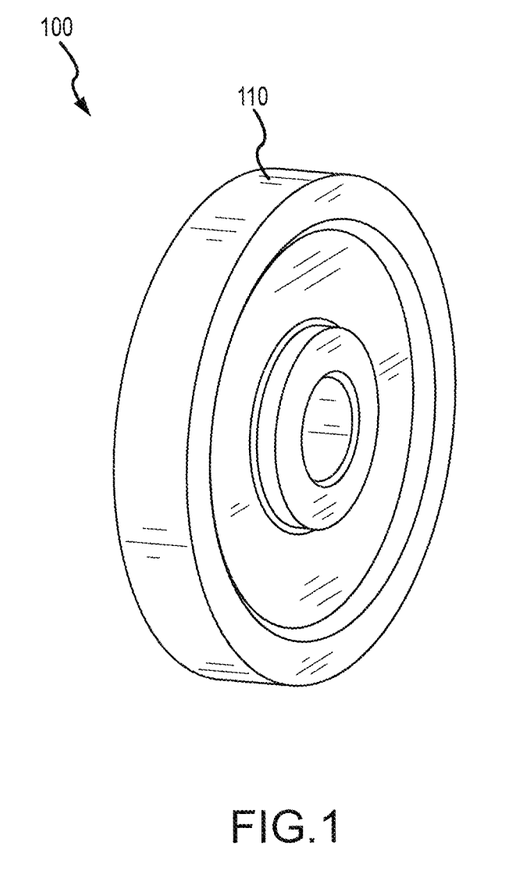
FIG. 1 illustrates a perspective view of a grinding wheel in accordance with various embodiments.

Referring to FIG. 1, a grinding wheel 100 is illustrated according to various embodiments. In various embodiments, grinding wheel 100 may comprise a multi-layer grinding wheel. Multi-layer grinding wheels may comprise a matrix of abrasive particles pressed and bonded together. In multi-layer grinding wheels, the abrasive particles may be distributed throughout the grinding wheel. Thus, as portions of grinding surface 110 are removed, additional abrasive particles may be exposed. In various embodiments, grinding wheel 100 may comprise a vitrified glass grinding wheel. However, in various embodiments, grinding wheel 100 may comprise a single-layer grinding wheel. In single-layer grinding wheels, a layer of abrasive particles may be electroplated onto the grinding surface of the grinding wheel. In various embodiments, the abrasive particles may comprise at least one of Cubic Boron Nitride ("CBN"), diamond, ceramic, Silicon Carbide, and Aluminum Oxide. Grinding wheels comprising diamond or CBN may be referred to as superabrasive. Grinding wheels comprising ceramic, Silicon Carbide, or Aluminum Oxide may be referred to as conventional.

Figure 2:
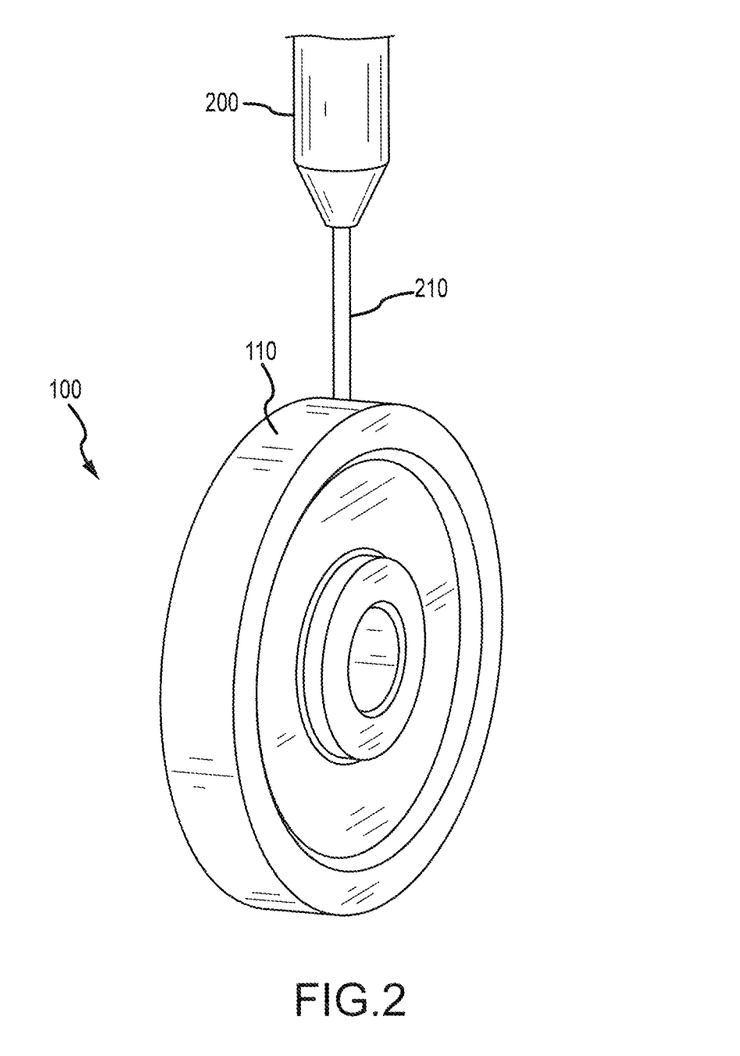
FIG. 2 illustrates a laser and a grinding wheel in accordance with various embodiments.

Referring to FIG. 2, a laser 200 is illustrated forming a surface feature on grinding wheel 100. In various embodiments, laser 200 may comprise a Nd:YAG (neodymium-doped yttrium aluminum garnet) laser. Nd:YAG is a crystal that may be used as a lasing medium for solid-state lasers. In various embodiments, a Nd:YAG laser may emit may emit a laser beam 210 comprising light at a wavelength of 1064 nm. However, in various embodiments, laser 200 may comprise a $CO_2$ laser (9400 nm-10600 nm), a fiber laser (multiple wavelengths), or any other suitable laser which may remove material from grinding wheel 100. The laser may cause material to evaporate, sublimate, or be converted to a plasma.

In various embodiments, laser 200 may be positioned substantially perpendicular to grinding surface 110 of grinding wheel 100. For example, in various embodiments, laser 200 may be positioned between 85 degrees to 90 degrees relative to grinding surface 110, or between 70 degrees and 90 degrees relative to grinding surface 110. The angle of laser 200 relative to grinding surface 110 may correspond to a removal rate and accuracy of material removal from grinding wheel 100.

Figure 3:
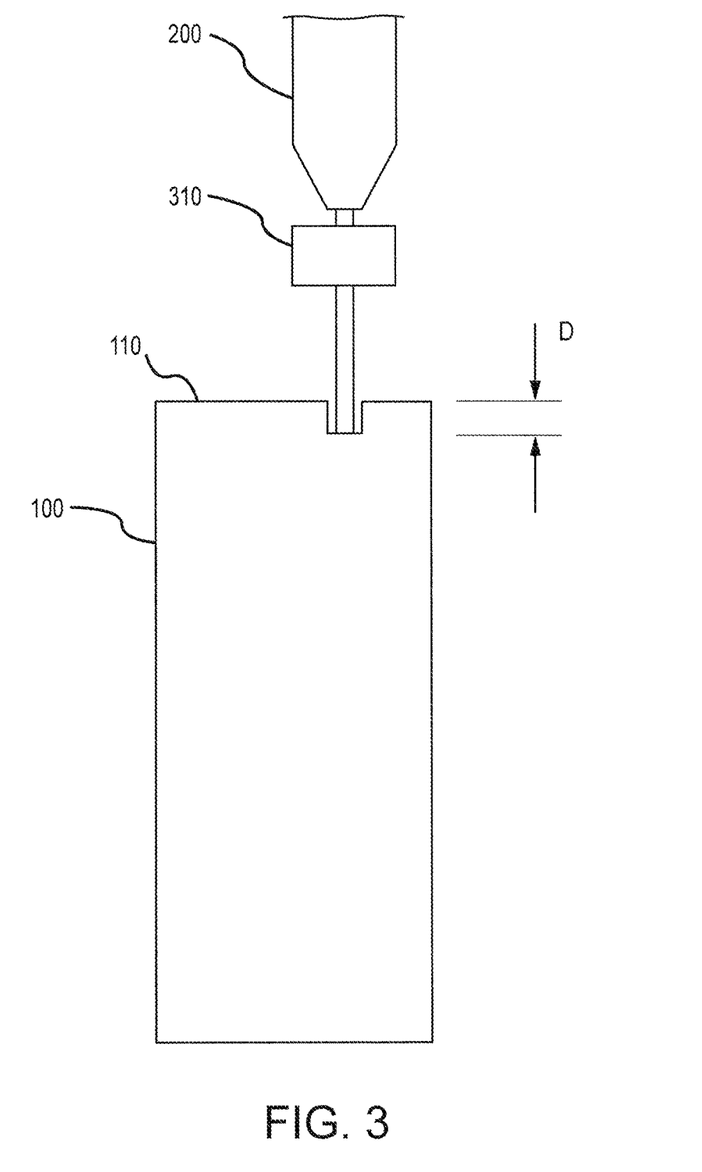
FIG. 3 illustrates a laser ablating a grinding surface of a grinding wheel in accordance with various embodiments.

Referring to FIG. 3, laser 200 is illustrated ablating grinding surface 110 according to various embodiments. In various embodiments, laser 200 may emit pulsed light. In various embodiments, the pulse rate may be between 10 kHz to 100 kHz, or between 5-400 kHz. Short pulses (e.g. 200-400 microseconds) may ablate material quickly from grinding surface 110 such that the surrounding material absorbs little heat.

In various embodiments, laser 200 may be moved relative to grinding wheel 100 in order to ablate patterns into grinding surface 110. In various embodiments, laser 200 may remain substantially perpendicular relative to grinding surface 110 while moving relative to grinding wheel 100. However, in various embodiments, the angle of laser 200 may change in order to direct laser 200 to various locations on grinding surface 110. In various embodiments, a galvanometer 310 may steer the laser using mirrors and a servo control system. In various embodiments, grinding wheel 100 may rotate during ablation in order for laser 200 to ablate different circumferential locations on grinding surface 110.

The depth D of ablation may depend on the optical properties of the material of grinding wheel 100, as well as the laser wavelength and pulse length. In various embodiments, laser 200 may ablate grinding surface to a depth of about 0.00001 inches-0.0005 inches (0.000025 cm-0.0013 cm).

Figure 4A:
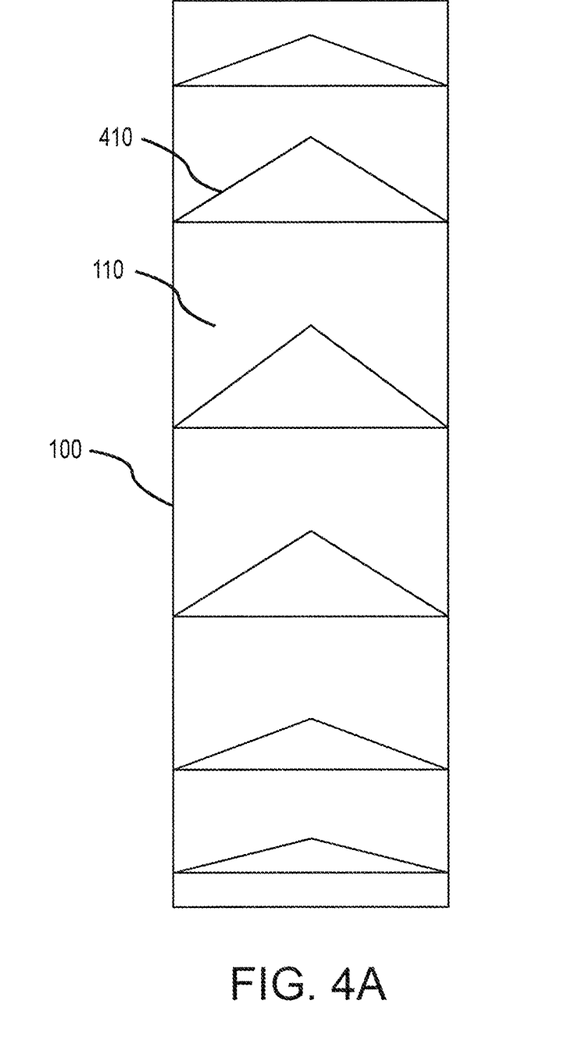
FIGS. 4A-4C illustrate various surface features in a grinding surface in accordance with various embodiments.
Figure 4B:
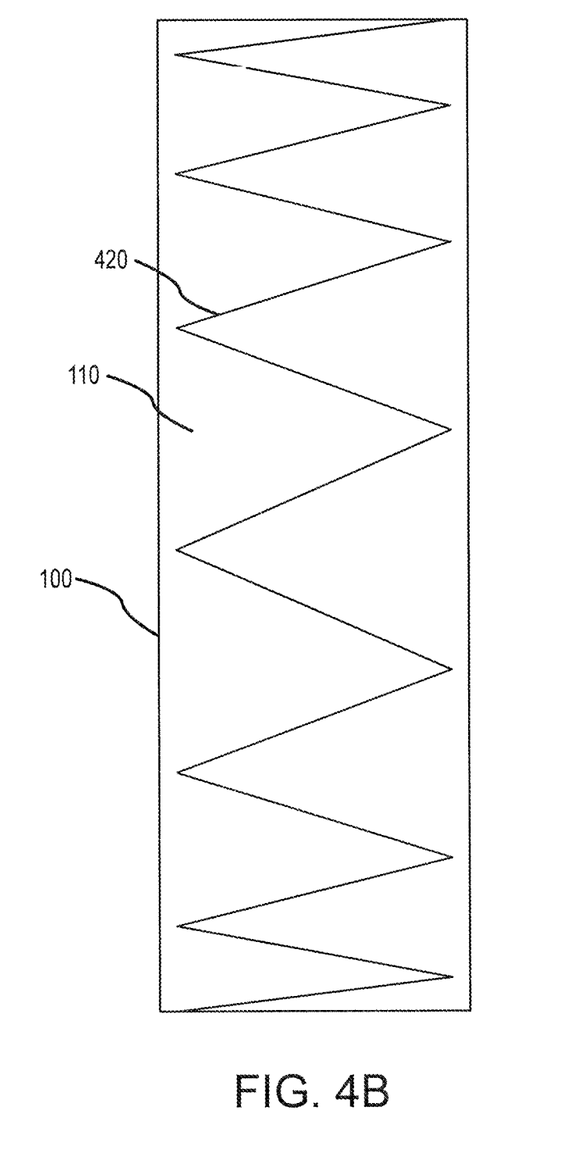
Figure 4C:
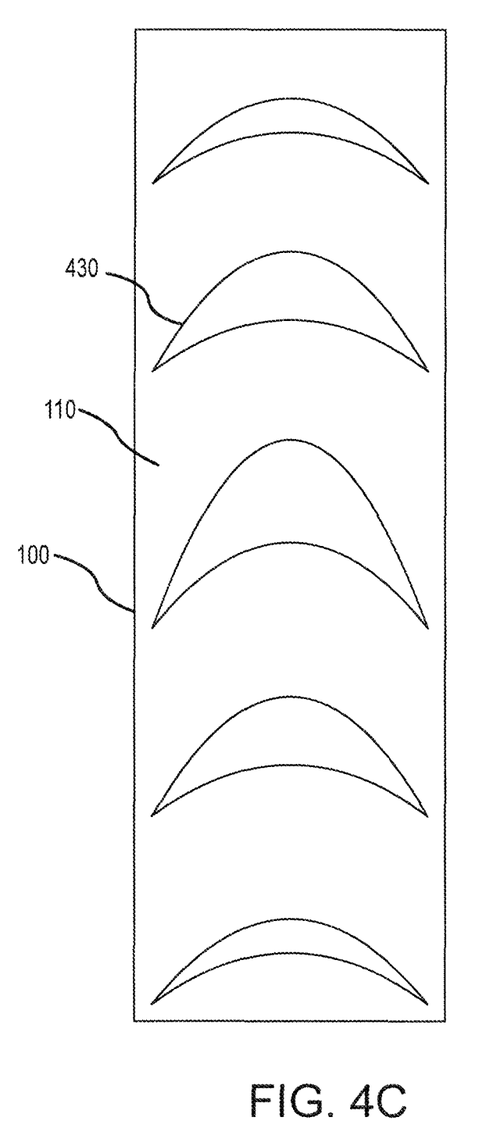

Referring to FIGS. 4A-4C, various laser ablated surface features are illustrated according to various embodiments. In FIG. 4A, a plurality of triangular surface features 410 are ablated into grinding surface 110. In various embodiments, the triangular surface features 410 may be discreet surface features. In FIG. 4B, a zig-zag pattern 420 is ablated into grinding surface 110. In various embodiments, zig-zag pattern 420 may be a continuous pattern which circumscribes grinding wheel 100. In FIG. 4C, a plurality of crescent shaped surface features 430 are ablated into grinding surface 110. The surface features may decrease the surface area of grinding surface 110 which makes contact with a workpiece. This may allow for additional coolant to be applied to the interface between grinding surface 110 and the workpiece. Additionally, the reduced surface area may decrease the horsepower necessary to turn grinding wheel 100 during grinding.

Figure 5:
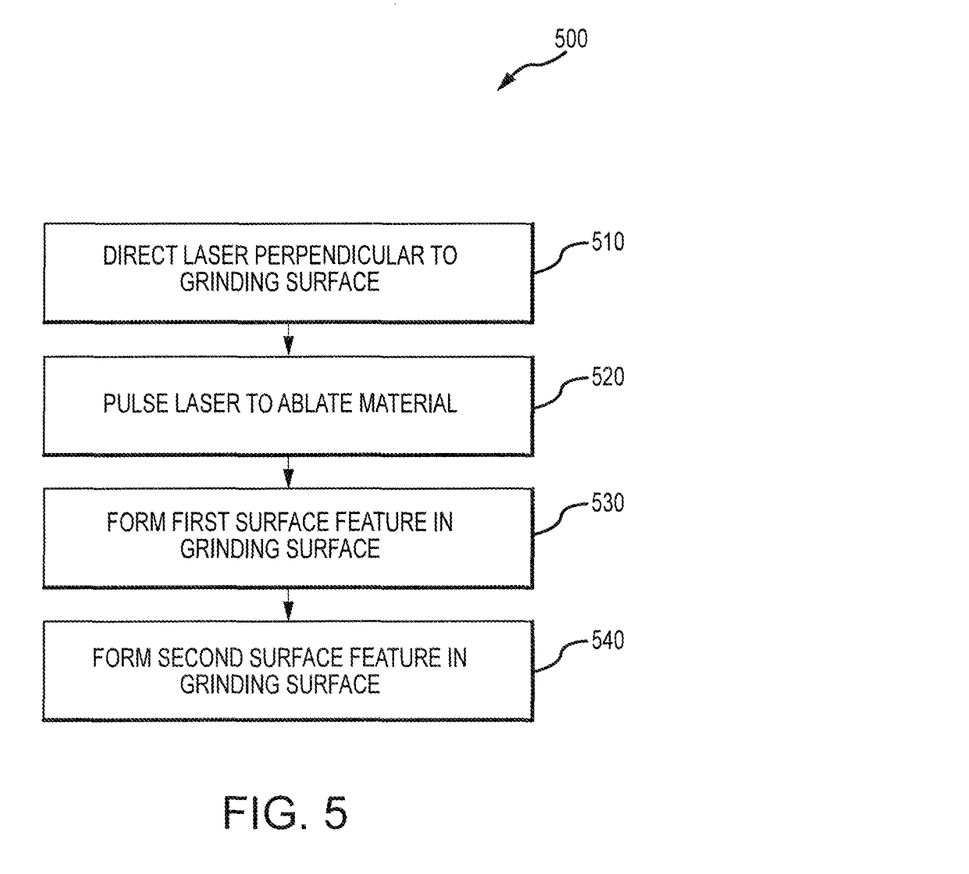
FIG. 5 illustrates a flow diagram of a process for dressing a grinding wheel in accordance with various embodiments.

Referring to FIG. 5, a process 500 of dressing a grinding wheel is illustrated according to various embodiments. In various embodiments, a laser may be directed substantially perpendicular to a grinding surface of a grinding wheel (step 510). The laser may emit a pulsed beam, and the beam may ablate material from the grinding surface (520). The laser may be moved or steered such that the laser forms a surface feature in the grinding surface (step 530).

In various embodiments a first surface feature may be desirable for grinding a first workpiece. However, a second surface feature may be desirable for grinding a second workpiece, or a different portion of the first workpiece. The first surface feature may be ablated into grinding surface 110, and grinding wheel 100 may be used to grind the first workpiece. Grinding surface 110 may subsequently be ground using conventional techniques or laser ablated to the depth of the first surface feature, essentially eliminating the first surface feature. The second surface feature may then be laser ablated into grinding surface 110 (step 540). Thus, the processes described herein may allow grinding wheel 100 to be used in situations with different surface requirements.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method of dressing a grinding wheel comprising:
   directing a laser substantially perpendicular to a grinding surface of a multi-layer grinding wheel, the multi-layer grinding wheel comprising a matrix of abrasive particles bonded together, wherein the multi-layer grinding wheel comprises a first plurality of exposed abrasive particles;
   pulsing the laser;
   forming a triangular surface feature in the grinding surface with the laser, wherein the forming the triangular surface feature exposes a second plurality of abrasive particles; removing the triangular surface feature with the laser; and forming a crescent shaped surface feature in the grinding surface with the laser by translating the laser across a width of the grinding surface while ablating material from the grinding wheel.

2. The method of claim 1, wherein the laser comprises at least one of a Nd:YAG laser, a $CO_2$ laser, and a fiber laser.

3. The method of claim 1, further comprising translating the laser across the width of the grinding surface while forming the triangular surface feature.

4. The method of claim 1, wherein the triangular surface feature comprises a continuous surface feature circumscribing the grinding wheel.

5. The method of claim 1, further comprising rotating the grinding wheel as the triangular surface feature is formed.

6. The method of claim 1, wherein the triangular surface feature is configured to enhance cooling of the grinding surface.

7. The method of claim 1, further comprising steering the laser with a galvanometer.

8. A grinding method comprising:
   laser ablating a triangular surface feature in a grinding surface of a multi-layer grinding wheel, wherein the multi-layer grinding wheel comprises a first plurality of exposed abrasive particles, and wherein the laser ablating exposes a second plurality of abrasive particles;
   grinding a first workpiece with the multi-layer grinding wheel;
   laser ablating crescent shaped surface feature in the multi-layer grinding wheel; and
   grinding a second workpiece with the multi-layer grinding wheel.

9. The method of claim 8, wherein the laser ablating comprises directing a pulsed laser substantially perpendicular to the grinding surface of the grinding wheel.

10. The method of claim 8, further comprising removing the triangular surface feature from the multi-layer grinding wheel prior to the laser ablating the crescent shaped surface feature.

11. The method of claim 8, wherein the laser ablating the triangular surface feature comprises steering a laser with a galvanometer.

* * * * *